US008428558B2

(12) United States Patent
Albert et al.

(10) Patent No.: US 8,428,558 B2
(45) Date of Patent: Apr. 23, 2013

(54) SYSTEM AND METHOD FOR ROUTING IN A WIRELESS MESH NETWORK

(75) Inventors: David A. Albert, Columbia, MD (US);
John V. Martinez, Roswell, GA (US);
Kevin R. Valerien, Gambrills, MD (US)

(73) Assignee: Axiometric, LLC, Columbia, MD (US)

( * ) Notice: Subject to any disclaimer, the term of this patent is extended or adjusted under 35 U.S.C. 154(b) by 355 days.

(21) Appl. No.: 12/939,955

(22) Filed: Nov. 4, 2010

(65) Prior Publication Data
US 2011/0044276 A1 Feb. 24, 2011

Related U.S. Application Data

(63) Continuation-in-part of application No. 11/408,053, filed on Apr. 21, 2006, now Pat. No. 8,126, 488.

(60) Provisional application No. 60/673,759, filed on Apr. 22, 2005.

(51) Int. Cl.
*H04L 12/58* (2006.01)
(52) U.S. Cl.
USPC ............... 455/412.1; 455/412.2; 455/414.2; 455/566; 455/462; 455/552.1; 455/445; 455/466; 370/356

(58) Field of Classification Search ............... 455/412.1, 455/412.2
See application file for complete search history.

(56) References Cited

U.S. PATENT DOCUMENTS

| 6,249,516 B1 | 6/2001 | Brownrigg et al. |
| 6,437,692 B1 | 8/2002 | Petite et al. |
| 6,791,994 B1 | 9/2004 | Young et al. |
| 6,836,737 B2 | 12/2004 | Petite et al. |
| 6,914,893 B2 | 7/2005 | Petite |
| 2005/0240520 A1 | 10/2005 | Stura et al. |
| 2007/0041427 A1 | 2/2007 | Small |

OTHER PUBLICATIONS

AAA Working Group, Hakala et al., "Diameter Credit Control Application" (Draft—ietf-aaa-diameter-cc-06.txt).

*Primary Examiner* — Olumide T Ajibade Akonai
*Assistant Examiner* — Randy Peaches
(74) *Attorney, Agent, or Firm* — Rahman LLC

(57) ABSTRACT

A system and method for routing in a wireless mesh network providing a first device, which includes a first device transceiver, a first device memory unit that includes a first device first queue, a first device second queue and a first device table of neighboring devices, and a first device central processing unit. Such a system also includes a second device that includes a second device transceiver, a second device memory unit that includes a second device first queue, a second device second queue and a second device table of neighboring devices, and a second device central processing unit.

20 Claims, 7 Drawing Sheets

FIG. 4

| Entry | Src | Type | Timestamp | Flags | Message Contents |
|---|---|---|---|---|---|
| 1 | D | 1 | 1233607264 | Low-duty | |
| 2 | D | 5 | 1233607200 | Low-duty | |
| 3 | B | 1 | 1233607264 | Medium-duty | |
| 4 | C | 1 | 1233607264 | Low-duty | |
| 5 | C | 5 | 1233605000 | Low-duty | |
| 6 | C | 3 | 1233604352 | Low-duty | |
| 7 | B | 4 | 1233600123 | Medium-Duty | |
| 8 | E | 1 | 1233607264 | High-Duty | |

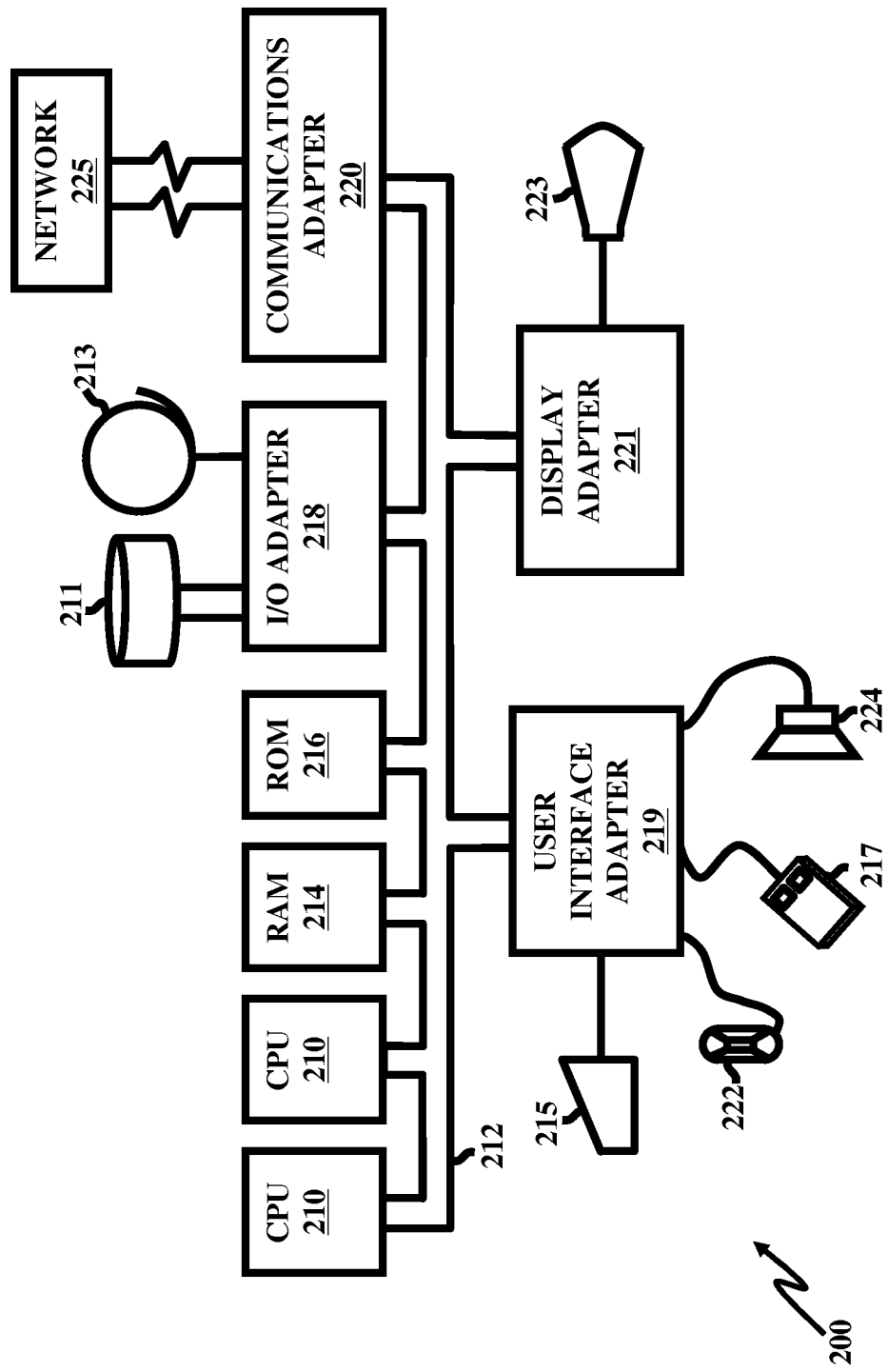

SYSTEM AND METHOD FOR ROUTING IN A WIRELESS MESH NETWORK

CROSS-REFERENCE TO RELATED APPLICATIONS

This application is a continuation-in-part of U.S. patent application Ser. No. 11/408,053, filed on Apr. 21, 2006 now U.S. Pat. No. 8,126,488, the complete disclosure of which, in its entirety, is herein incorporated by reference, which claims the benefit of U.S. Provisional Application Ser. No. 60/673,759, filed on Apr. 22, 2005, the complete disclosure of which, in its entirety, is herein incorporated by reference.

BACKGROUND

1. Technical Field

The embodiments herein generally relate to wireless communications and, more particularly, to a highly reliable, fault tolerant, ad-hoc wireless mesh network and related methods of operation.

2. Description of the Related Art

Contemporary wireless communication networks ("networks") typically allow simultaneous communication between several independently operating wireless devices. In order to provide the simultaneous communication, it is important that the devices do not interfere with each other's transmissions and to ensure that devices sending and receiving messages are properly tuned and synchronized with respect to each other. Devices capable of interfering with each other's transmissions are referred to as adjacent devices.

In order for transmissions to be properly sent and received, it is important that no two adjacent devices transmit data over the same communication channel at the same time, an event referred to as a collision. Where two adjacent devices transmit data over the same communication channel at the same time, it typically results in interference, making it difficult for intended recipients of the transmissions to disentangle originally transmitted data.

A common approach used in radio frequency (RF) communication in an effort to ensure that no two adjacent devices transmit over the same communication channel at the same time is to divide the available RF spectrum into fixed quanta called "frequency channels", divide time into fixed quanta called "timeslots" which are aggregated into fixed groups called "frames", and allow transmitters to send data using different frequency channels or different timeslots. An example of this type of communication is frequency hopping spread spectrum communication.

In a wireless network where both the RF spectrum and time are divided up, each separate combination of a particular "frequency channel" and a particular "timeslot" constitutes a unique "communication mode" that does not interfere with other communication modes in the network. Where the available RF spectrum is divided into many frequency channels and time is divided into many timeslots, each device in the network has a large number of non-interfering communication modes that it can use to communicate, thus making it possible for a large number of devices to participate in the network without interference. In addition, since the transmissions of two devices can only cause interference if the two devices are within RF range of one another, the likelihood of interference between devices can be further reduced by manipulating the spacing of the devices and the power level of the transmissions within a network.

FIG. 1 illustrates a wireless communication network including a plurality of wireless devices "A" through "R". Devices that are within RF range of each other (referred to as "adjacent devices") have a line drawn between them. For example, devices "A", "B", and "C" are within RF range of each other. Hence, in order to ensure that transmissions involving devices "A", "B", or "C" are properly sent and received, no two of these devices may transmit on the same frequency channel during the same timeslot. In addition, in order for device "A" to successfully transmit data to devices "B" and "C" using a particular frequency channel and a particular timeslot, devices "B" and "C" must tune their receivers to the particular frequency channel during the particular timeslot in order to receive the message.

FIG. 2 illustrates an exemplary set of communication modes for a wireless network configuration. In FIG. 2, time is divided into sequential frames comprising 24 timeslots each, and the available RF spectrum is divided into 50 frequency channels. The beginning of a frame (timeslot 1) will be referred to as a "frame time" or a "synchronized time reference". Each box in the grid shown in FIG. 2 represents one communication mode. For a particular frame of time, the number of available communication modes is the number of timeslots multiplied by the number of frequency channels, or in this case, 50*24=1200 modes.

Although dividing time and available RF bandwidth helps limit the amount of interference in a wireless network, it creates a complication for the devices of determining which frequency channels and timeslots the other devices are using. In order for a communication to succeed, a device transmitting data and a device receiving the transmitted data must both use the same timeslot and frequency channel. Since wireless networks often involve a large number of frequency channels and timeslots, the likelihood that a particular pair of devices will use the same frequency channel/timeslot combination by chance alone is very slim. As a result, it is necessary for devices to coordinate their communications in some structured way. For example, networks that use timeslot assignment require mechanisms to synchronize the timing of adjacent transmitters and receivers to ensure successful communication.

SUMMARY

In view of the foregoing, an embodiment herein provides a system for routing a message through a wireless network comprising a first device comprising a first transceiver operatively connected to the wireless network and transmitting the message; a first memory unit comprising a first device first queue storing first device Not Acknowledged (NAK) messages for the first device, wherein the first device NAK messages are stored for transmission; a first device second queue storing first device Acknowledged (ACK) messages for the first device, wherein ACK messages are transmitted at a lower priority than the first device NAK messages; and a first device table of neighboring devices; and a first central processing unit, wherein the first central processing unit maintains the first device first queue, wherein the first device appends the message to the first device first queue and transmits the message; maintains the first device second queue, wherein the first device removes the message from the first device first queue and adds the message to the first device second queue only after the transceiver receives the message; and maintains the first device table of neighboring devices; and a second device comprising a second transceiver operatively coupled to the wireless network and receiving the message; a second memory unit comprising a second device first queue storing second device Not Acknowledged (NAK) messages for the second device, wherein the second device NAK messages are stored for transmission; a second device second queue storing second device Acknowledged (ACK) messages for the second device, wherein the second device ACK messages are transmitted at a lower priority than the second device NAK messages and a second device table of neighboring devices; and a second central processing unit, wherein the second central processing unit maintains the second device first queue, wherein the second device adds the message to the second device first queue upon receiving the message; maintains the second device second queue; maintains the second device table of neighboring devices; and determines at least one of ignoring the message, and storing and forwarding the message.

In such a system, at least one of the first device table of neighboring devices and second device table of neighboring devices may comprise at least one of a Receive Link Quality (RLQ), a Transmit Link Quality (TLQ), a link cost, and a route cost column. Furthermore, the RLQ may be calculated by at least one of the first central processing unit and the second central processing unit as 100×(received messages/sent messages). Moreover, the TLQ may comprise an RLQ value received from a neighboring device on the wireless network. In addition, the link cost may be calculated by at least one of the first central processing unit and the second central processing unit as transmission rate*required transmission attempts, where the transmission rate is a transmission rate of the wireless network, required transmission attempts comprises at least one of the RLQ and the TLQ, and is calculated for a neighboring device.

Such a system may further comprise a third device, wherein the second device memory unit further comprises a second device route cost and the second device route cost is calculated by the second central processing unit as a sum of link costs from the second device to the third device. Moreover, the third device may be a root device of the wireless network. Furthermore, at least one of the first device first queue and the second device first queue may comprise at least one of an entry, a source, a type, a timestamp, a flag, and message contents column. In addition, at least one of the first device second queue and the second device second queue may comprise at least one of an entry, a source, a type, a timestamp, a flag, an acknowledging (ack) device identifier, an ack cost and a message contents column.

Embodiments herein also provide a network of wireless devices comprising a message comprising message contents and a routing cost; a first device comprising a first memory unit comprising a first device route cost; a first device first queue storing first device Not Acknowledged (NAK) messages for the first device, wherein the first device NAK messages are stored for transmission; a first device second queue storing first device Acknowledged (ACK) messages for the first device, wherein the first device ACK messages are transmitted at a lower priority than the first device NAK messages; and a first device table of neighboring devices comprising a first Receive Link Quality (RLQ), a first Transmit Link Quality (TLQ), a first link cost, and a first route cost column; and a first transceiver operatively connected to the wireless network and transmitting the message, wherein the routing cost of the message comprises the first device route cost; a first central processing unit, wherein the first central processing unit maintains the first device first queue, wherein the first device appends the message to the first device first queue and transmits the message; maintains the first device second queue, wherein the first device removes the message from the first device first queue and adds the message to the first device second queue only after the transceiver receives the message from a neighboring device closer to the destination of the message; and maintains the first device table of neighboring devices; and a second device, neighboring the first device, the second device comprising a second transceiver operatively coupled to the wireless network and receiving the message; a second memory unit comprising a second device route cost; a second device first queue storing second device Not Acknowledged (NAK) messages for the second device, wherein the second device NAK messages are stored for transmission; a second device second queue storing second device Acknowledged (ACK) messages for the second device, wherein the second device ACK messages are transmitted at a lower priority than the second device NAK messages; and a second device table of neighboring devices comprising a second Receive Link Quality (RLQ), a second Transmit Link Quality (TLQ), a second link cost, and a second route cost column, wherein the second TLQ comprises the first RLQ; and a second central processing unit, wherein the second central processing unit calculates the second device route cost as a sum of link costs from the second device to a root device; maintains the second device first queue by determining whether to add the message to the second device first queue upon receiving the message, wherein the second device adds the message to the second device first queue when the routing cost of the message is greater than the second device route cost; maintains the second device second queue; maintains the second device table of neighboring devices.

In such a network, at least one of the first RLQ and second RLQ may be calculated by at least one of the first central processing unit and the second central processing unit, respectively, as 100×(received messages/sent messages). Furthermore, at least one of the first link cost and second link cost may be calculated by at least one of the first central processing unit and the second central processing unit, respectively, as transmission rate*required transmission attempts, where the transmission rate is a transmission rate of the wireless network and the required transmission attempts comprises the first RLQ and the second RLQ, respectively. In addition, the root device comprising a root transceiver and a root central processing unit, wherein the route cost of the second device may be calculated by the second central processing unit as a sum of link costs from the second device to the root device. Moreover, upon the root device receiving the message, the root device may compute a metadata message of the message using the root central processing unit and transmits the metadata message using the root transceiver. Furthermore, at least one of the first device and the second device may remove the message from at least one of the first memory unit and the second memory unit, and may store the metadata message in the first memory unit and the second memory unit, respectively, upon receiving the metadata message. Additionally, at least one of the first device first queue and the second device first queue may comprise at least one of an entry, a source, a type, a timestamp, a flag, and message contents column. Moreover, at least one of the first device second queue and the second device second queue may comprise at least one of an entry, a source, a type, a timestamp, a flag, an acknowledging (ack) device identifier, an ack cost and a message contents column.

Embodiments herein also provide a method of routing a message in a wireless network comprising providing a first device, wherein the first device comprises a first transceiver operatively connected to the wireless network and transmitting the message; a first memory unit comprising a first device first queue; and a first device table of neighboring devices; and a first central processing unit; storing first device Not Acknowledged (NAK) messages for the first device in the first device first queue, wherein the first device NAK messages are stored for transmission; storing first device Acknowledged (ACK) messages for the first device in the first device second queue, wherein the first device ACK messages are transmitted at a lower priority than the first device NAK messages; maintaining the first device first queue comprising appending the message to the first device first queue and transmitting the message; maintaining the first device second queue comprising removing the message from the first device first queue and adding the message to the first device second queue only after the first transceiver receives the message from a neighboring device closer to the destination of the message; and maintaining the first device table of neighboring devices; providing a second device, wherein the second device comprises a second transceiver operatively coupled to the wireless network and receiving the message; a second memory unit comprising a second device first queue; a second device second queue; and a second device table of neighboring devices; and a second central processing unit; storing second device Not Acknowledged (NAK) messages for the second device in the second device first queue, wherein the second device NAK messages are stored for transmission; storing second device Acknowledged (ACK) messages for the second device in the second device second queue, wherein the second device ACK messages are transmitted at a lower priority than the second device NAK messages while stored in the second device second queue; maintaining the second device first queue comprising adding the message to the second device first queue upon receiving the message; maintaining the second device second queue; maintaining the second device table of neighboring devices; and determining at least one of ignoring the message, and storing and forwarding the message.

Such a method may further comprise calculating at least one of a Receive Link Quality, a Transmit Link Quality, a link cost, and a route cost. In addition, the route cost may comprise calculating a transmission rate*required transmission attempts, wherein the transmission rate is a transmission rate of the wireless network and the required transmission attempts comprises at least one of the RLQ and the TLQ.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 illustrates a data structure of a NAK queue according to the embodiments herein;

FIG. 7 illustrates a schematic diagram of a computer architecture used in accordance with the embodiments herein.

DETAILED DESCRIPTION OF PREFERRED EMBODIMENTS

Figure 1:
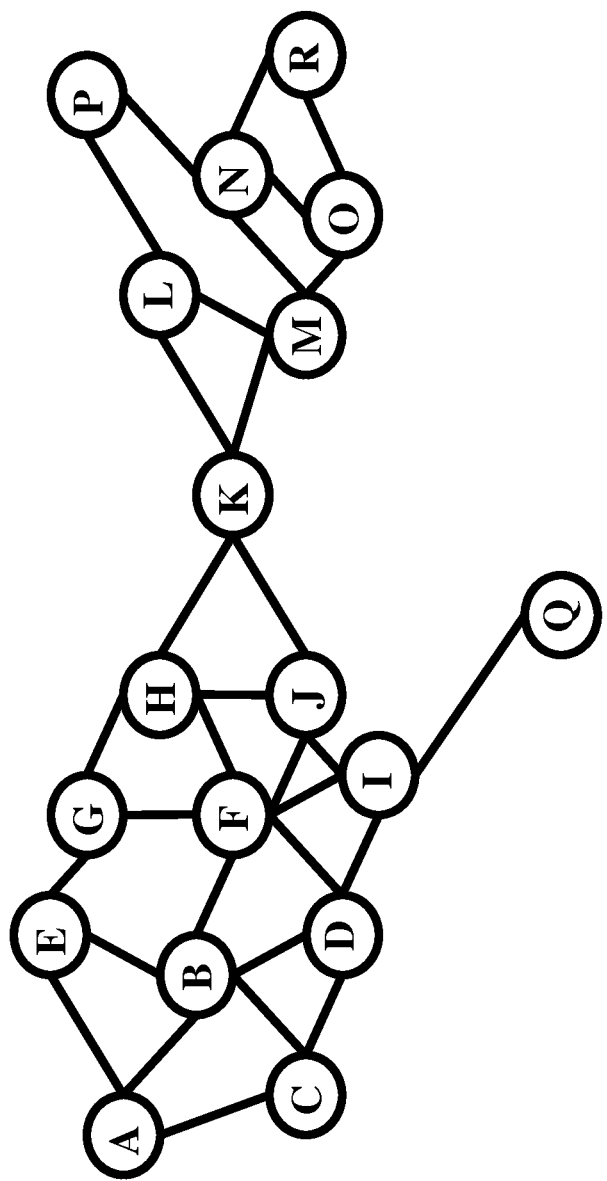
FIG. 1 illustrates a schematic diagram of a structure for wireless network communications.
Figure 2:
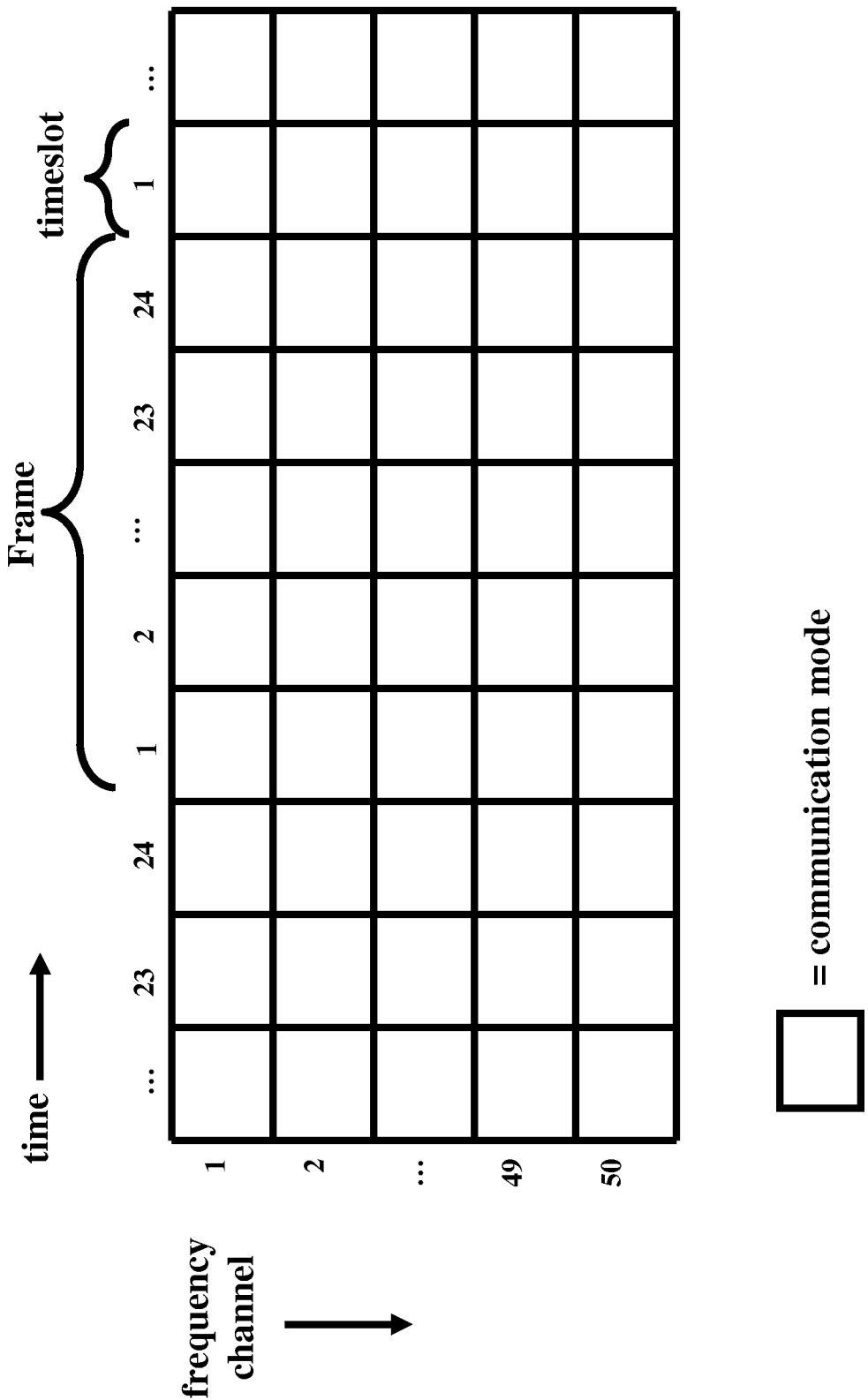
FIG. 2 is a diagram illustrating communication modes for an exemplary configuration of a wireless network.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method and system for wireless mesh network communications. As described below, wireless mesh networks may be used to collect data from a plurality of remote sensing devices and may also be used to manage and control remote devices. Embodiments described herein may include networks structured as "trees" with a gateway device (or "root" device) that serves as the controller for a wireless mesh network and a plurality of remote devices (operating as branches or "leaves"). In addition, the gateway device may also serve as a bridge between the wireless mesh network and another network—such as a traditional TCP/IP wired or wireless network, as described in further detail below. Referring now to the drawings, and more particularly to FIGS. 3 through 7, where similar reference characters denote corresponding features consistently throughout the figures, there are shown embodiments herein.

Figure 3:
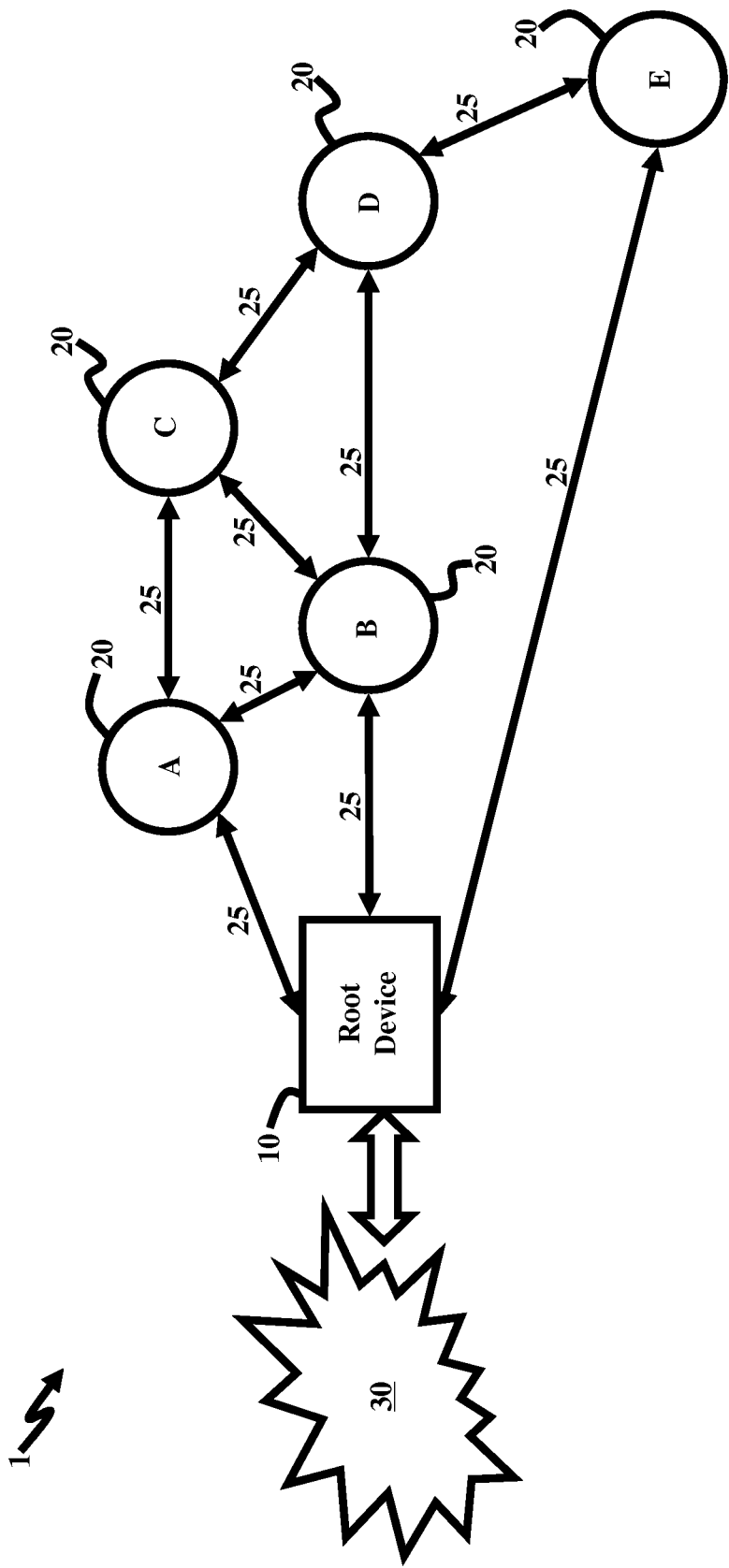
FIG. 3 illustrates schematic diagram of a wireless network, according to embodiments described herein.

The embodiments herein describe a network layer responsible for delivering (e.g., routing) messages from any remote device in a tree-structured network (as described below) to a root/gateway device (as described below) or from the root outward to one or more remote devices. Illustrated in FIG. 3 is wireless mesh network 1, which includes gateway device (e.g., root 10) and a plurality of remote devices 20 (A-E) that communicate with each other and with gateway device (e.g., root 10) using wireless communication links 25 (e.g., through RF channels). Wireless mesh network 1 may include a low-cost, low-power, wireless mesh networking standard; e.g., a mesh network based on the IEEE 802.15.4-2003 standard (also known as a Zigbee network). The IEEE 802.15.4-2003 standard is a publication of the Institute of Electrical and Electronic Engineers, Inc. and is incorporated, in its entirety, herein by reference. In addition, gateway device (e.g., root 10) may connect remote devices 20 with external network 30.

In the embodiments described below, wireless mesh network 1 uses TDMA and FDM to allow gateway device (e.g., root 10) and remote devices 20 to share a common data transmission medium (e.g., the radio spectrum), as further described in U.S. patent application Ser. No. 11/408,053, the complete disclosure of which, in its entirety, is herein incorporated by reference. Using TDMA and FDM methods described in U.S. patent application Ser. No. 11/408,053, incorporated in its entirety herein by reference, each remote device 20 utilizes specific time periods and frequency channels to send and/or receive messages.

As discussed in further detail below, in wireless mesh networks according to embodiments, each device in the network may generate data and may also serve as a repeater: receiving data from other devices and forwarding that data towards its destination. The process of receiving and forwarding data is referred herein as "routing". In its simplest form, all data received is forwarded, which is referred herein as "flood routing". Flood routing offers the greatest redundancy of transmission (all data is transmitted by all devices), but provides the least efficient use of network bandwidth since the data travels many paths that do not help the data reach its destination.

Frequently, wireless networks have limited bandwidth; accordingly, embodiments herein may use some heuristic to limit routing to one or more paths that steer the data towards its destination. There are numerous such methods, which must balance a variety of factors including: number of redundant paths (more paths improve reliability at the expense of bandwidth), speed of response to changes in the communications medium (e.g. ability to change paths in response to congestion, equipment failures, or interference), memory/storage requirements, and algorithm complexity.

For example, one embodiment herein includes a wireless network (e.g., wireless network 1) that uses a gradient-descent method (as described below) to route data from remote devices (e.g., devices 20) to the root (e.g., root 10) of the network tree (as shown in FIG. 3). The network gradient is based on the estimated time required for the data to reach the root/gateway device (e.g., root 10) and for acknowledgments of receipt to reach the data source. The time required for data to traverse a path comprising multiple devices (e.g., device 20) is the sum of the times required to traverse each of the communication links in that path. For example, referring to FIG. 3, the time required for a message to traverse the path from device C through device A to the gateway (e.g., root 10) is the sum of the time required for the message to traverse the link between device C and device A and the time required for the message to traverse the link between device A and the gateway (e.g., root 10). As described in further detail below, the time required for a message to traverse a given set of links is determined, according to an embodiment herein, by the quality of each of the links and various other factors such as congestion.

One embodiment herein uses a frequency and time-slotted point-to-point communications protocol (e.g., MAC layer) wherein time is divided into quanta referred herein as "frames" and the frames are further divided into quanta referred herein as "slots" (e.g., as described in U.S. patent application Ser. No. 11/408,053, incorporated herein in its entirety by reference). The available wireless bandwidth is also subdivided into multiple frequency channels. In such an embodiment, each device 20 is allocated one or more slot and frequency (forming a unique channel) in each frame in which it may transmit data. The particular channel a device 20 will use to transmit data varies with each frame (e.g., as described in U.S. patent application Ser. No. 11/408,053). For example, in one embodiment herein, frames are 6-seconds in duration and slots are 250 ms in duration (i.e., 24 slots per frame). The frequency of frames used by a particular device or class of devices (e.g., device 20) to transmit data is configurable and may be adjusted to balance power consumption with bandwidth.

In such an embodiment, with the above-mentioned MAC-layer protocol, devices (e.g., device 20) transmit periodically at predictable intervals. Using defined methods (e.g., as described below) that allow each device 20 to determine how many packets have been sent by each neighbor, a device 20 can track how many of those packets have been successfully received. The quality of a channel between any two devices (e.g., device 20) can be expressed as a probability that a given message sent across that channel will be received by the peer device 20.

For example, a given channel may have a 33% successful communication rate suggesting that on average, it will require three frames to send a message across the channel. If a message needed to traverse two such channels to reach its destination, it would require an average of six frames.

By comparing number of transmissions sent by a neighboring device 20 with the number received, each device 20 can evaluate the quality of the wireless communication link with each of its neighbors. This link quality is referred herein as the Packet Error Rate (PER) and describes the ratio of transmissions received in error or not received at all with transmissions received successfully. The PER of a link can be described as a percentage: PER=100×(1−(Packets Received/Packets Sent)). In other embodiments, in the event some packet transmissions are intentionally ignored e.g. due to scheduling conflicts or other activities, the PER is calculated as: PER=100×(1−(Packets Received/(Packets Sent−Packets Skipped))). In such an embodiment, the quality of a link is viewed as the inverse of its packet error rate. Moreover, in such embodiments, this is referred to as the Receive Link Quality (RLQ). The RLQ is calculated as a percentage: RLQ=100×(Packets Received/Packets Sent).

In such an embodiment, each device 20 maintains a table of its neighbors (other devices with which it can communicate directly) and their RLQs. For example, referring to FIG. 3, device A might maintain the information shown below in Table 1:

TABLE 1

| Neighbor | RLQ |
| --- | --- |
| B | 25% |
| C | 50% |
| Gateway | 50% |

The RLQs in Table 1, stored in device A, refer to how well information transmitted by each of device A's neighbors is received by device A. For example, an RLQ of 25% for device B indicates that on average, one of every four transmissions sent by device B is received by device A. The quality of a wireless link (e.g., link 25) is often asymmetric: the quality of the channel from device A to device B may be different than the quality of the channel from device B to device A. This asymmetry results from various internal and external properties of the network (e.g., wireless network 1) such as proximity of interference sources to one device 20 or the other which may cause more destructive interference to messages being received by one device 20 than by the other.

In order to properly evaluate the bi-directional link quality, devices (e.g., device 20) periodically broadcast their list of neighbors and RLQs so that neighboring devices (e.g., device 20) can determine how well their transmissions are being received. Using the example above, device A may transmit the information in Table 1. When device B receives the information, it will note that A receives its transmissions with 25% RLQ (or 75% PER) and will store that information which is referred to as the Transmit Link Quality (TLQ). Similarly, device B would transmit the information in its table and when device A receives information about how well device B receives data from device A, that data will be stored in device A as the TLQ to device B so that the table in device A would include a TLQ column, as shown below in Table 2:

TABLE 2

| Neighbor | RLQ | TLQ |
|---|---|---|
| B | 25% | 33% |
| C | 50% | 50% |
| Gateway | 50% | 33% |

Taken together, the RLQ and the TLQ describe the quality of the link (e.g., link 25) between two devices (e.g., device 20) in each direction.

In addition, according to some embodiments herein, link qualities are used to estimate the time it would take a transmission to traverse the link. For example, if a link 25 has a 75% PER (a 25% RLQ), it will, on average require four transmission attempts for a given transmission to succeed. If transmissions are sent periodically at predictable intervals, this can be translated into an estimated average time to traverse the link (e.g., link 25): Time-to-traverse=transmission rate*required transmission attempts. The time to traverse a link 25 can be interpreted as the cost and is referred herein as the "link cost". Assuming one transmission attempt every 6 seconds, the table for device A could translate link qualities into estimated time required for a message to traverse each of the links (e.g., link 25) and to be acknowledged (the link cost in seconds) as shown in Table 3:

TABLE 3

| Neighbor | RLQ | TLQ | Link Cost |
|---|---|---|---|
| B | 25% | 33% | 42 |
| C | 50% | 50% | 24 |
| Gateway | 50% | 33% | 30 |

Where, for example, the average estimated time for a message to traverse the link between devices A and B would be: A<-B=4 attempts @ 6 sec per attempt=24 sec; B<-A=3 attempts @ 6 sec per attempt=18 sec; and Total round trip (RT) link cost=24+18=42 seconds.

As described in further detail below, embodiments herein use the link cost information (e.g., shown in Table 3) in each device 20 (shown in FIG. 3) together with a gradient-descent routing algorithm to route data from remote devices (e.g., device 20) to the network root (e.g., root 10). Each device 20 in wireless network 1 calculates a routing metric (e.g., a number), which may also be referred herein as a "route cost". The route cost, as described herein, is based on the best estimated round-trip time required for a message sent by a device 20 to reach the root 10 and for an acknowledgment sent from root 10 to reach device 20 (i.e. the sum of the link costs along the fastest path to and from root 10).

The route cost for a device 20 is calculated and included in transmissions from the device 20 so that its neighbors may learn its route cost; typically a device 20 includes its route cost in every transmission; however, the frequency of route cost transmission may be reduced to improve bandwidth at the expense of responsiveness to changes in the link costs.

In one embodiment herein, root device 10, the destination for all messages routed in this embodiment, has a routing metric of 0 by definition (i.e., it takes no time for a message sent from root 10 to reach root 10 and be acknowledged). Each non-root device (e.g., device 20) determines its own route cost based on the estimated time required for a message sent from the device 20 to reach root (10) and for a response sent from root (10) to reach the device 20 (e.g., the estimated round-trip message delivery time). When a device 20 has not yet determined whether it has a path to root 10, such a device will advertise a maximum value route cost.

Each device 20 stores the route cost transmitted by its neighbors along with their link quality and cost data. In some embodiments described herein, the link cost is not necessarily stored and may instead be calculated when needed from the RLQ and TLQ; however for clarity, the embodiments below show the link cost in a table (e.g., table 4, shown below). As shown in the embodiment of FIG. 3, once device A has received information from each of its neighbors, it will have stored the route costs advertised by each neighbor and will have calculated the link costs for each neighbor, as shown in Table 4 below:

TABLE 4

| Neighbor | RLQ | TLQ | Link Cost | Route Cost |
|---|---|---|---|---|
| B | 25% | 35% | 42 | 40 |
| C | 50% | 50% | 24 | 54 |
| Gateway | 50% | 33% | 30 | 0 |

With every transmission, each device 20 examines its table of neighbors and their link and route costs and evaluates how long it would take for a message it receives to be routed to root 10 and for an acknowledgment to be received. For example, by examining Table 4, device A can determine that the aggregate average cost to send a message through device A, to device B, to the root 10 would be 40+42=82 seconds. The cost to send a message through device A, to device C to the root 10 would be 54+24=78 seconds. The cost to send a message through device A to the root 10 would be 0+30=30 seconds. Since, by definition, device A's route cost should represent the best path to the root through device A, the route cost for device A is set at 30. The route cost for a device 20 is always the lowest sum of the link and route cost for any neighbor.

From the example above, device A would then report its routing metric as "30" in each transmission. If the quality of the link (e.g., link 25) between device A and root 10 improved, the routing metric would get lower; if the link (e.g., link 25) became worse, the routing metric would get higher. Lower routing metrics represent better (faster) paths to root 10. A device 20 that could communicate with both devices A and C would immediately recognize device A as the better path to root 10 based on its lower route cost.

In conventional networks (e.g., wired networks), routing is performed by the transmitting device, which selects which device should receive data next on its path to the destination; the transmitter then sends the data on the appropriate wire (or fiber) to deliver the data to the selected next device. Such traditional methods often adversely affect performance in wireless networks. For example, in wireless networks (e.g., wireless network 1), transmissions are usually omni-directional: when a device transmits, all neighbors are able to receive the transmission; this is inherent in the shared wireless-medium. As described in further detail below, in some embodiments herein, routing decisions are made by the receiving devices (e.g., device 20) rather than the transmitter (e.g. another device 20).

As described above, in contrast with conventional systems, routing decisions are made by a receiving device in the embodiments herein, whereas in traditional networks routing decisions are made by the sender. According to one embodiment herein, each transmission from a device 20 includes its route cost. When a device 20 with a lower route cost receives data from a device 20 advertising a higher route cost, it will store and forward (i.e., route) the data whereas if the data is received by a device 20 with a similar or higher route cost, the receiver will not forward (i.e., route) the data. This causes the routed data to flow towards its destination (i.e., root 10).

In addition, because the routing decision is made by the receiving device, not the transmitter according to the embodiments herein; the embodiments herein avoid the need for routing tables and defined paths found in conventional systems and thereby respond more quickly to dynamic changes in the wireless environment. The gradient descent methods described herein also maintain multiple paths for robustness while controlling the number of paths to improve bandwidth.

As described in further detail below, one embodiment herein uses a store-and-forward architecture in which messages received are stored in a cache and forwarded towards their destination. In some cases, the volume of messages received and stored by any given device 20 may exceed its transmission capacity in which case that device 20 becomes a bottleneck: as more messages are received and stored for forwarding than can be transmitted, the average delay associated with forwarding a message through the device increases; herein, this is referred to as "congestion". In addition to the features described above, embodiments herein also consider the effects of congestion on a wireless network (e.g., wireless network 1).

For example, according to one embodiment herein, the delay in message forwarding resulting from congestion is calculated by dividing the number of stored (cached) messages awaiting transmission by the number of messages that can be transmitted in each available transmit slot and multiplying by the expected number of transmissions required for each message to reach the expected neighbor (e.g., based on the link quality with that neighbor): congestion delay=(# msgs pending tx/# msgs sent in each tx)*link cost.

Each device 20 consequently monitors the average congestion over a period often corresponding to the periodic nature of data generation and adds the average delay associated with that congestion to the routing metric of device 20. The result is that devices (e.g. device 20) that become congested raise their route cost until they no longer represent a better path to the root (e.g., root 10) for some of their neighbors or it is established that there is no better path despite the congestion; this effectively load-balances the flow of messages around bottlenecks.

In addition, device 20 may be within wireless range of multiple downstream (e.g., closer to root 10) devices; each of the downstream devices offers a path for messages sent by the upstream device. According to strict receive-side routing, as described above, a message sent by the upstream device is stored and forwarded by each of the downstream devices. For example, referring to FIG. 3, if device D has good communication links (e.g., using link 25) with neighbors C, and B, both of which are closer to root 10, it may be desirable in one embodiment herein for the message to be routed only by neighbor B and thereby free bandwidth on device C to potentially carry messages from other devices.

Therefore, according to an embodiment herein, each device 20 stores the route and link costs to each direct neighbor, a transmitting device is able to evaluate which downstream (e.g., closer to root 10) neighbors are likely to receive each transmission. In addition, when device 20 determines that multiple downstream neighbors may route the data, the transmitting device includes a routing threshold in the transmission that specifies a maximum route cost for routing the message. A device 20 receiving this message will compare its route cost with the specified threshold and if the route cost is higher than the threshold, the device 20 will not route the message (e.g., even if the route cost of the receiving device is lower than the route cost of the transmitting device—which may trigger routing in other embodiments described herein). The sending device may balance robustness and speed of data delivery with bandwidth consumed by setting the threshold higher or lower respectively.

Using the example above, when device D transmits with a routing metric of "70" and devices B and C have routing metrics of "40" and "54" respectively. Device D will set a routing threshold of "47" to cause only device B to route the messages from device D.

In addition, in some embodiments, transmissions of device D may be received (and routed) by other devices (e.g., device 20) with routing metrics below "47" that device D does not have good bi-directional communication links (e.g., link 25). In such embodiments, routing by additional devices (e.g., device 20) increases the redundancy of routing and the transmitted routing threshold (described above) helps reduce excessive redundancy. For example, if another device X (not shown) with a route cost of 25 was introduced to wireless network 1 (shown in FIG. 3), and unknown to device D due to asymmetric link quality, device X may receive the message from device D and route it in addition to the routing by device B.

In conventional wireless mesh sensor networks, end-to-end message acknowledgment often has unacceptably long latencies. For example, round-trip latencies may be affected by frequency of transmission, reliability of communication links, and other factors. Moreover, in a battery operated wireless network that operates on a low duty cycle to conserve power, the interval between the transmission of messages from each device may be lengthy (e.g. 20-30 minutes). If a message must traverse many devices to reach its destination, the number of devices (hops) that must be traversed is multiplied by the transmission interval to determine the one-way message latency. If communication links are not perfect, the messages may need to be re-transmitted multiple times to cross each link. Acknowledgements require a similar process for an acknowledgement from the destination to reach its source; the resulting total latencies are often unacceptably long.

Embodiments herein use a store-and-forward architecture, with hop-by-hop acknowledgement, to overcome the problems described above facing conventional systems. With hop-by-hop acknowledgement, described below, each device 20 considers transmitted data acknowledged when it receives that same data from another device 20 further downstream (closer to its destination). This improves bandwidth utilization by eliminating the need for explicit acknowledgments and also improves latencies. For example, in FIG. 3 device D transmits message X (not shown) destined for the root 10 and then moves the message to the back of a queue of unacknowledged data scheduled for re-transmission (described in further detail below); device B receives message X (not shown) and compares the route cost of device D (e.g., route cost "70") to its own route cost (e.g., route cost "40"); since the route cost of device B is lower than device D, the message should be routed; device B stores message X (not shown) for forwarding (described in further detail below) and schedules it for transmission as soon as possible (e.g., places it on the front of a queue of unacknowledged data scheduled for transmission); device D will continue to transmit message X (not shown) until it receives the message from device B, at which point it compares the route cost of B (e.g. route cost "40") to its own route cost (e.g., route cost "70") and concludes that the message has been accepted by a downstream device (closer to the root 10); device D then considers message X (not shown) acknowledged because it has received positive confirmation that the message has moved at least one hop further downstream and notes that it has been acknowledged by device B with route cost 40; device D moves message X (not shown) to the front of its acknowledged data queue (described in further detail below) and de-schedules it for transmission; device D will no longer transmit message X (not shown) unless it learns that network conditions have changed and its own route cost has become lower than device B (or the lowest device in wireless network 1 that device D is aware has acknowledged message X) in which case it moves message X (not shown) back to the unacknowledged data queue and re-schedules it for transmission; moving message X (not shown) further downstream (towards its destination) is now the responsibility of device B and the process described above repeats until message X reaches root 10. Device B will transmit message X until it receives message X from another device with a lower routing metric (e.g. root device 10) in which case it moves message X (not shown) to the front of its acknowledged data queue and de-schedules it for transmission. Message X will only be re-transmitted by device B if it is received again from device D or another upstream device in which case device B will schedule message X for re-transmission from its acknowledged data queue, but this transmission will be scheduled with a lower priority than messages in the unacknowledged data queue and will include an indication that message X has been acknowledged to prevent downstream devices from attempting to route the message again.

As described above, embodiments herein are self-configuring and adapt dynamically to changing wireless conditions; this makes it possible for devices (e.g., device 20) to reverse their relationship (e.g., upstream/downstream). To prevent data from being mis-routed or the formation of routing loops, when data is acknowledged by a downstream device, the ID and route cost of the downstream device is noted and stored with the data. If the devices (e.g., device 20) reverse their relationship (e.g., the acknowledging device subsequently reports a higher route cost than the local device or the local device's route cost becomes lower than the stored route cost of the acknowledging device), the data is considered unacknowledged and re-scheduled for transmission.

Due to the queuing relationships between newly received messages and newly transmitted messages, when wireless links are good and bandwidth consumption is high, a given message will often only be transmitted once by each device 20 along its path to the destination. This is achieved by placing newly transmitted messages at the back of the queue of messages to be transmitted (described in further detail below) while newly received messages are placed on the front of the queue of messages to be transmitted. This optimizes bandwidth utilization when it is needed (e.g., when the queues are deep).

In one embodiment herein, messages are uniquely identified to allow them to be acknowledged when transmitted by other devices (e.g., device 20). For example, a message may include information about the originating device, a message type, and a timestamp. In further embodiments herein, devices (e.g., device 20) also indicate whether a newer message from the same source and of the same type should replace a stored message using a flag bit or implicitly via the message type.

In addition, another embodiment herein stores messages that have been acknowledged and are maintained in a separate queue; i.e., not normally scheduled for transmission and when scheduled, are scheduled at a lower priority than unacknowledged messages. When a device 20 transmits a message, the message includes information as to whether the message is acknowledged. If a device 20 receives a message from an upstream neighbor that is not acknowledged, but the device 20 has the message stored in its acknowledged queue, the message is re-scheduled for transmission (but at lower priority than unacknowledged data). When the message is transmitted, the acknowledged indication will inform downstream devices that the message is being sent to squelch an upstream device and should not be routed downstream and does not require acknowledgment from a downstream device.

As discussed above, one embodiment herein is a wireless networks (e.g., wireless network 1), which is a tree-structured network with a central controller device (e.g., root 10), referred herein as the "root" of the network, that is either the source or the destination for all data packets. Data that has been transmitted with the root (e.g., root 10) as the destination is considered successfully delivered when the data reaches the root device (e.g., root 10). Upon receipt of a message, the root (e.g., root 10) typically stores the message and may forward the message onto a different network, (e.g., the Internet) using TCP/IP protocols.

Data received by root 10 is considered "root acknowledged", meaning that it has reached its terminal destination and should no longer be transmitted. Root 10 does not have to store the full contents of each message received (e.g., once the data has been forwarded onto the second network), but in one embodiment herein, metadata about the message is stored (for example, the originating device, message type, and timestamp) to allow root 10 to inform other devices that the message has been received.

After receipt and forwarding of a new message, root 10 moves metadata about the message to the front of a queue to be transmitted (as described in further detail below). The metadata forms a gateway acknowledgment ("GAK") message that informs other devices (e.g., device 20) that the specified message has reached its final destination. A device 20 receiving a GAK for a stored message will move the message to its queue of acknowledged data (as described in further detail below) and flag the message as being root-acknowledged. According to one embodiment herein, root acknowledged data is never moved back to the unacknowledged queue.

In addition, according to one embodiment herein, GAK messages are re-transmitted if the same message is received from an upstream device that has not yet received the root-acknowledgment. Thus, GAK messages are transmitted at lower priority than unacknowledged data but are propagated upstream to help squelch data that is no longer needed. In addition, because GAK messages are shortened (e.g., they only contain the message metadata, not the message contents), GAK messages provide a more efficient method of acknowledging data.

As described above, in embodiments herein, data to be transmitted is stored in a data structure known as a cache. The cache holds messages received from other devices (e.g., device 20) that are to be forwarded towards their final destination; the cache also may hold locally generated messages while awaiting transmission. According to one embodiment herein, each cache entry holds a message and metadata regarding the message such as the data type, length, originating device, times the message originated, duration the data has been held in the cache, information about acknowledgments received for the data, and various flags that control management of the data.

Figure 5:
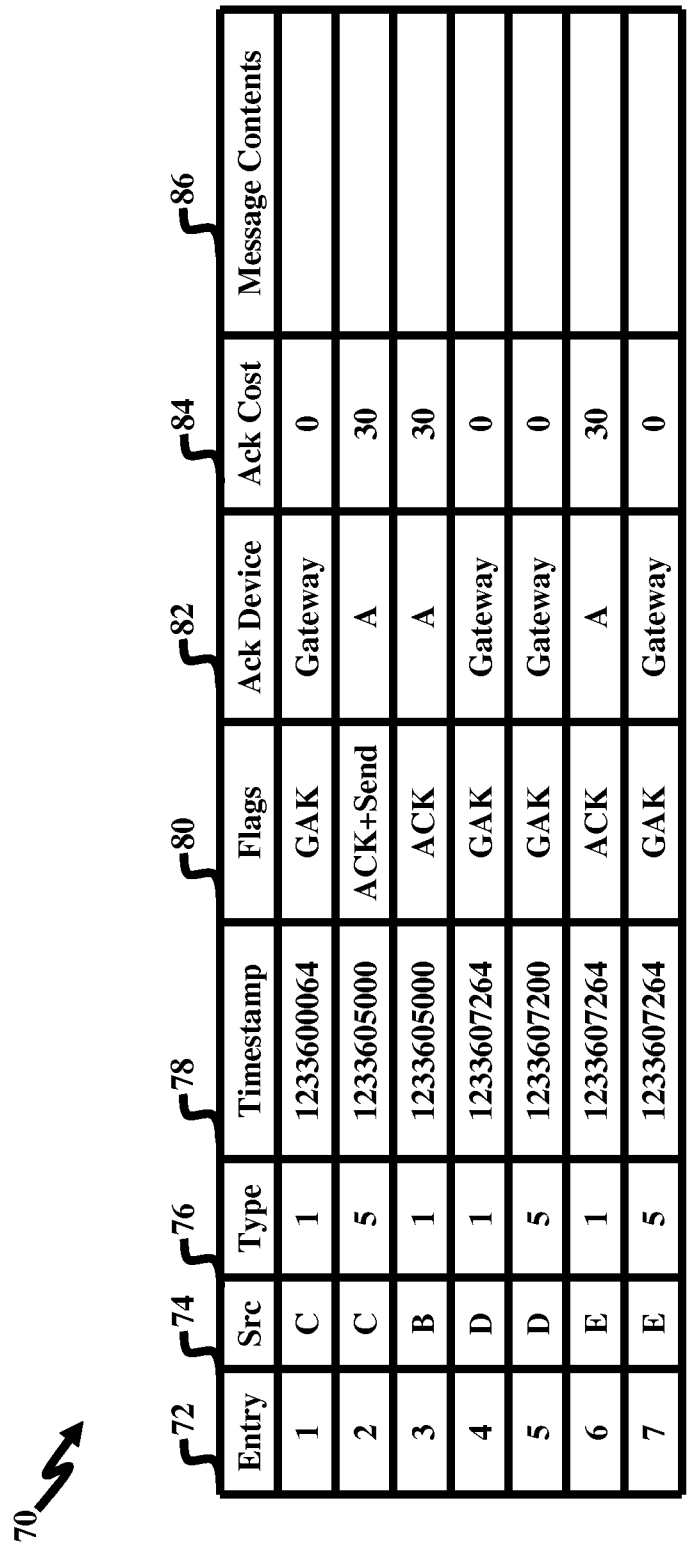
FIG. 5 illustrates a data structure of an ACK queue according to the embodiments herein.

Furthermore, in embodiments herein, the cache is divided into two data structures referred herein as "queues". FIGS. 4 and 5 illustrate tables of the two queues, with sample data, according to the embodiments herein. The queues divide the messages according to whether they have been acknowledged ("ACK"), as shown in FIG. 4, meaning forwarded successfully, or not acknowledged ("NAK"), as shown in FIG. 5. The decision as to which messages to transmit each time there is a transmit opportunity is based on various priorities including the queue storing the data. According to one embodiment herein, wireless network 1 includes a variety of mixed-duty-cycle devices (not shown); a portion of each queue is thus reserved for high-duty-cycle messages in high-duty-cycle devices to prevent the queues from becoming clogged with low-duty-cycle messages.

As described above, FIG. 4, with reference to FIG. 3, illustrates a sample NAK queue 50. In FIG. 4, NAK queue 50 includes the following fields: entry 52, source (i.e., src) 54, type 56, timestamp 58, flags 60, and message contents 62. According to one embodiment herein, the operation of NAK queue 50 is as follows: when a device (e.g., device 20) receives (or generates) a new unacknowledged message, it adds the message to its cache (not shown), schedules it for transmission, and inserts it in the front of the NAK queue (e.g., entry "1" in the entry 52 field). Messages are pulled from the front of the NAK queue first (highest priority) for transmission. According to such an embodiment, root devices (e.g., root 10) do not have a NAK queue since messages are implicitly acknowledged once received by the root device (e.g., root 10). In addition, for non-root devices (e.g., device 20), when a message is received from a downstream neighbor, the message is moved to the front of the ACK queue and de-scheduled for transmission; otherwise, when a non-root device (e.g., device 20) transmits an unacknowledged message from the front of its NAK queue, the message is moved to the back of the NAK queue which enforces fairness for transmission of messages and maximizes the chances of receiving an acknowledgment for the message before it is re-transmitted thereby optimizing bandwidth utilization.

As described above, FIG. 5, with reference to FIGS. 3 and 4, illustrates a sample ACK queue 70. In FIG. 5, ACK queue 70 includes the following fields: entry 72, source (i.e., src) 74, type 76, timestamp 78, flags 80, Ack device 82, Ack cost 84, and message contents 86. According to one embodiment herein, the operation of ACK queue 70 is as follows: when a message is acknowledged (e.g., due to receipt from a downstream device), the message is de-scheduled for transmission and inserted at the front of the ACK queue (e.g., ACK queue 70). Acknowledged messages are only re-transmitted when an upstream device transmits the same data unacknowledged (i.e., when the upstream device is not aware that the data has been received by a downstream device), the message is then scheduled for re-transmission and moved to the front of the ACK queue (e.g., ACK queue 70). Data is pulled from the front of the ACK queue (e.g., ACK queue 70) for transmission once all queued NAK messages (e.g., as stored in NAK queue 50) have been sent. Each time an acknowledged message is sent, it is de-scheduled for transmission. The end of the ACK queue represents acknowledged data least recently scheduled for transmission. Cache entries are selected for eviction from the end of the ACK queue. This prioritizes the transmission of acknowledgments for messages most recently received from upstream devices over messages least recently received enabling the rapid clearing of queues in devices with good connectivity.

According to an embodiment herein, because forwarding unacknowledged messages becomes the responsibility of the device with the lowest route cost that has received that message, cached messages are preserved; accordingly, messages are stored in a persistent manner (e.g., a storage unit, not shown) when possible or else messages may be lost if a device loses power or is reset.

In addition, according to an embodiment herein, to prevent the cache from filling and becoming unable to store and forward new messages, old messages are evicted (e.g., deleted) when new messages are received. According to such an embodiment, messages are selected for eviction based on: the age of the message (e.g., how long it has been since the message was originally generated); if the message exceeds a configurable age indicating that it is obsolete, the message can be deleted from all device caches; and if no obsolete messages are available, acknowledged messages that have not been scheduled for transmission for the longest time (e.g., the messages at the end of the ACK queue 70) are deleted first.

In addition, according to an embodiment herein, unacknowledged messages (e.g., those at the front of the NAK queue) are always given transmission priority over acknowledged messages.

In addition, according to an embodiment herein, each device 20 may generate local messages for transmission. Newly generated messages are placed in the unacknowledged message queue (e.g., NAK queue 50). Because newly generated messages are not yet redundantly transmitted by other devices (e.g., devices 20), such messages are given increased transmission priority using a greedy priority inversion method, as described below. For example, with each transmission opportunity, locally generated unacknowledged messages are given priority (moved to the front of the NAK queue 50) over foreign (i.e., received from other devices) unacknowledged messages with some configurable probability (e.g. 20% of the time).

In addition, according to one embodiment herein, acknowledged messages that have never been transmitted are given transmission priority over acknowledged messages that have been transmitted at least once. Moreover, when a device 20 receives a newly root-acknowledged message, the message is scheduled for transmission and given priority over other ACK messages in order to propagate the shorter and more effective GAK messages upstream.

As described above, an embodiment herein includes mixed-duty-cycle devices (not shown) within wireless network 1 (shown in FIG. 3). In such an embodiment, devices (e.g., device 20) are operating at different duty cycles. For example, a network (e.g., wireless network 1) may include battery-powered devices (not shown) operating at a low-duty cycle to conserve energy and AC/line/solar powered devices (not shown) operating at a higher-duty-cycle to provide more bandwidth.

In such an embodiment, when unacknowledged messages are received by a high-duty-cycle device (not shown), that data is scheduled for transmission at the earliest opportunity and also at the next opportunity that matches the duty cycle of the device it was received from (as shown in flags 60 of FIG. 4). In addition, according to an embodiment herein, the initial re-transmission of newly received GAK messages is scheduled for high duty cycles, to try to propagate GAKs into the caches of high-duty-cycle devices (not shown). Propagating GAKs to high-duty devices (not shown) frees more of their bandwidth and cache storage.

Figure 6:
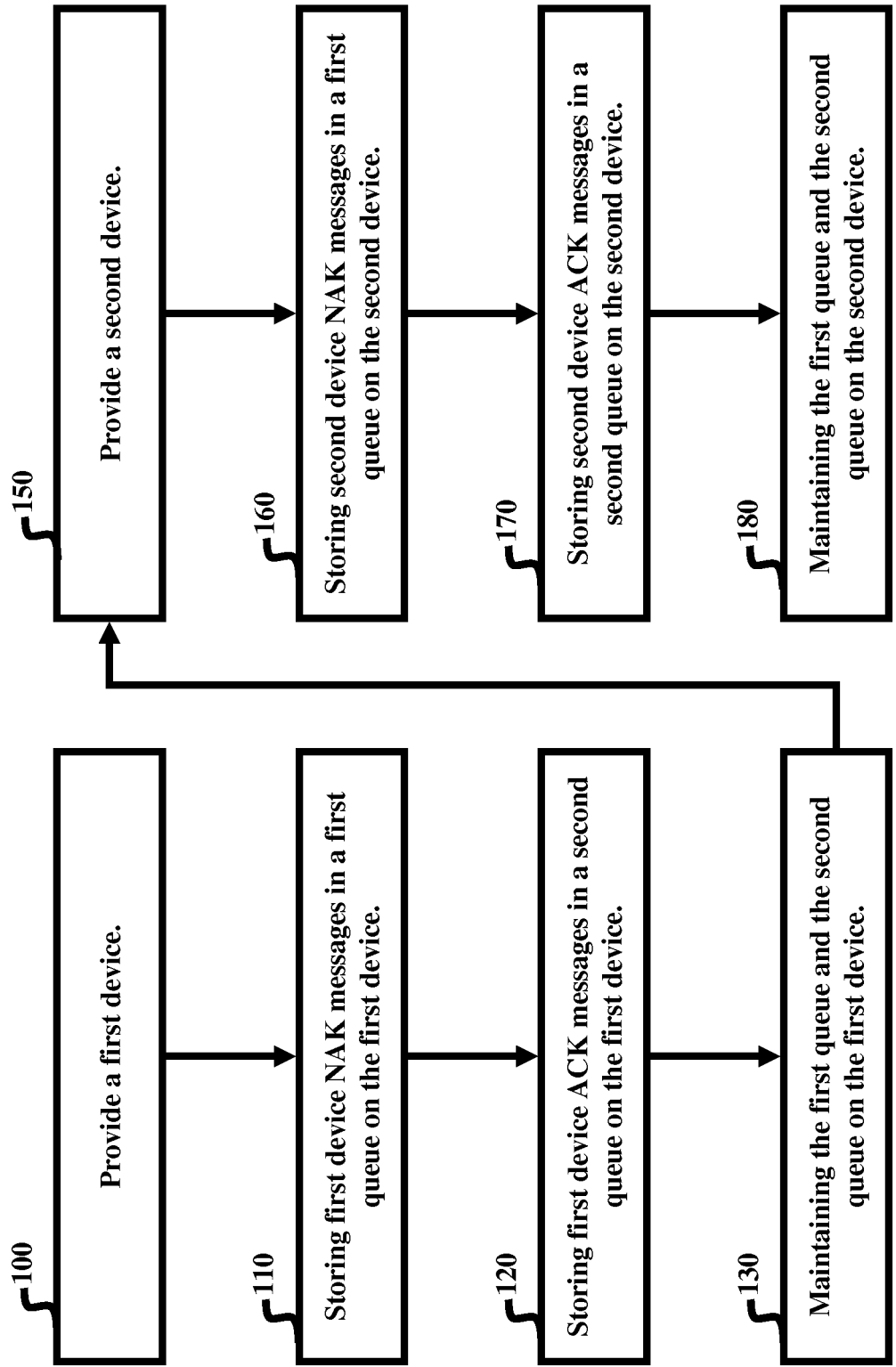
FIG. 6 is a flow diagram illustrating a preferred method according to an embodiment herein.

FIG. 6, with reference to FIGS. 1 through 5 and FIG. 7, illustrates a flow diagram according to an embodiment herein. Step 100 of the method shown in FIG. 6 provides a first device (e.g., device A 20 shown in FIG. 3). Step 110 stores first device NAK messages in a first queue (e.g., as stored in RAM 214 shown in FIG. 7) on the first device (e.g., device A 20 shown in FIG. 3). Step 120 stores first device ACK messages in a second queue (e.g., as stored in RAM 214 shown in FIG. 7) on the first device (e.g., device A 20 shown in FIG. 3). Step 130 maintains the first queue and the second queue on the first device (e.g., using CPU 210 shown in FIG. 7). Step 140 provides a second device (e.g., device B 20 shown in FIG. 3). Step 150 stores second device NAK messages in a first queue (e.g., as stored in RAM 214 shown in FIG. 7) on the second device (e.g., device B 20 shown in FIG. 3). Step 170 stores second device ACK messages in a second queue (e.g., as stored in RAM 214 shown in FIG. 7) on the second device (e.g., device B 20 shown in FIG. 3). Next, step 180 of the method of FIG. 6, maintains the first queue and the second queue on the second device (e.g., using CPU 210 shown in FIG. 7).

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multi-chip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A more general representation of the hardware environment for practicing the embodiments herein is depicted in FIG. 7. This schematic drawing illustrates hardware configuration 200 of an information handling/computer system in accordance with the embodiments herein. Hardware configuration 200 comprises at least one processor or central processing unit (CPU) 210. The CPUs 210 are interconnected via system bus 212 to various devices such as a random access memory (RAM) 214, read-only memory (ROM) 216, and an input/output (I/O) adapter 218. The I/O adapter 218 can connect to peripheral devices, such as disk units 211 and tape drives 213, or other program storage devices that are readable by the system. The system can read the inventive instructions on the program storage devices and follow these instructions to execute the methodology of the embodiments herein. The system further includes a user interface adapter 219 that connects a keyboard 215, mouse 217, speaker 224, microphone 222, and/or other user interface devices such as a touch screen device (not shown) to the bus 212 to gather user input. Additionally, a communication adapter 220 connects the bus 212 to a data processing network 225, and a display adapter 221 connects the bus 212 to a display device 223 that may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for routing a message through a wireless network, said system comprising:
 a first device comprising:
  a first transceiver operatively connected to said wireless network and transmitting said message;
  a first memory unit comprising:

a first device first queue storing first device Not Acknowledged (NAK) messages for said first device, wherein said first device NAK messages are stored for transmission;

a first device second queue storing first device Acknowledged (ACK) messages for said first device, wherein said first device ACK messages are transmitted at a lower priority than said first device NAK messages; and a first device table of neighboring devices; and a first central processing unit, wherein said first central processing unit:

maintains said first device first queue, wherein said first device appends said message to be transmitted to said first device first queue and transmits said message;

maintains said first device second queue, wherein said first device removes said message from said first device first queue and adds said message to said first device second queue only after said transceiver receives said message; and maintains said first device table of neighboring devices; and a second device comprising:

a second transceiver operatively coupled to said wireless network and receiving said message;

a second memory unit comprising:

a second device first queue storing second device Not Acknowledged (NAK) messages for said second device, wherein said second device NAK messages are stored for transmission;

a second device second queue storing second device Acknowledged (ACK) messages for said second device, wherein said second device ACK messages are transmitted at a lower priority than said second device NAK messages; and a second device table of neighboring devices; and a second central processing unit, wherein said second central processing unit:

maintains said second device first queue, wherein said second device adds said message to said second device first queue upon receiving said message;

maintains said second device second queue;

maintains said second device table of neighboring devices; and determines at least one of ignoring said message, and storing and forwarding said message.

2. The system of claim 1, wherein at least one of said first device table of neighboring devices and said second device table of neighboring devices comprises at least one of a Receive Link Quality (RLQ), a Transmit Link Quality (TLQ), a link cost, and a route cost column.

3. The system of claim 2, wherein said RLQ is calculated by at least one of said first central processing unit and said second central processing unit as 100×(received messages/sent messages).

4. The system of claim 2, wherein said TLQ comprises a RLQ value for a neighboring device on said wireless network.

5. The system of claim 2, wherein said link cost is calculated by at least one of said first central processing unit and said second central processing unit as transmission rate*required transmission attempts, wherein said transmission rate is a transmission rate of said wireless network, and wherein said required transmission attempts comprises at least one of said RLQ and said TLQ, and is calculated for a neighboring device.

6. The system of claim 2, further comprising a third device, wherein said second device memory unit further comprises a second device route cost, and said second device route cost is calculated by said second central processing unit as a sum of link costs from said second device to said third device.

7. The system of claim 6, wherein said third device is a root device of said wireless network.

8. The system of claim 1, wherein at least one of said first device first queue and said second device first queue comprises at least one of an entry, a source, a type, a timestamp, a flag, and a message contents column.

9. The system of claim 1, wherein at least one of said first device second queue and said second device second queue comprises at least one of an entry, a source, a type, a timestamp, a flag, an acknowledging (ack) device identifier, an ack cost, and a message contents column.

10. A network of wireless devices, said network comprising:

a message comprising message contents and a routing cost;

a first device comprising:

a first memory unit comprising:

a first device route cost;

a first device first queue storing first device Not Acknowledged (NAK) messages for said first device, wherein said first device NAK messages are stored for transmission;

a first device second queue storing first device Acknowledged (ACK) messages for said first device, wherein said first device ACK messages are transmitted at a lower priority than said first device NAK messages; and a first device table of neighboring devices comprising a first Receive Link Quality (RLQ), a first Transmit Link Quality (TLQ), a first link cost, and a first route cost column; and a first transceiver operatively connected to said wireless network and transmitting said message, wherein said routing cost of said message comprises said first device route cost;

a first central processing unit, wherein said first central processing unit:

maintains said first device first queue, wherein said first device appends said message to be transmitted to said first device first queue and transmits said message;

maintains said first device second queue, wherein said first device removes said message from said first device first queue and adds said message to said first device second queue only after said transceiver receives said message; and maintains said first device table of neighboring devices; and a second device neighboring said first device, said second device comprising:

a second transceiver operatively coupled to said wireless network and receiving said message;

a second memory unit comprising:

a second device route cost;

a second device first queue storing second device Not Acknowledged (NAK) messages for said second device, wherein said second device NAK messages are stored for transmission;

a second device second queue storing second device Acknowledged (ACK) messages for said second device, wherein said second device ACK messages are transmitted at a lower priority than said second device NAK messages; and a second device table of neighboring devices comprising a second Receive Link Quality (RLQ), a second Transmit Link Quality (TLQ), a second link cost, and a second route cost column, wherein said second TLQ comprises said first RLQ; and a second central processing unit, wherein said second central processing unit:

calculates said second device route cost as a sum of link costs from said second device to a root device;

maintains said second device first queue by determining whether to add said message to said second device first queue upon receiving said message, wherein said second device adds said message to said second device first queue when said routing cost of said message is greater than said second device route cost;

maintains said second device second queue; and maintains said second device table of neighboring devices.

11. The network of claim 10, wherein at least one of said first RLQ and second RLQ is calculated by at least one of said first central processing unit and said second central processing unit, respectively, as 100×(received messages/sent messages).

12. The network of claim 10, wherein at least one of said first link cost and second link cost is calculated by at least one of said first central processing unit and said second central processing unit, respectively, as transmission rate*required transmission attempts, wherein said transmission rate is a transmission rate of said wireless network and said required transmission attempts comprises said first RLQ and said second RLQ, respectively.

13. The network of claim 10, wherein said root device comprises a root transceiver and a root central processing unit, wherein said route cost of said second device is calculated by said second central processing unit as a sum of link costs from said second device to said root device.

14. The network of claim 10, wherein upon said root device receiving said message, said root device computes a metadata message of said message using said root central processing unit and transmits said metadata message using said root transceiver.

15. The network of claim 14, wherein at least one of said first device and said second device removes said message from at least one of said first memory unit and said second memory unit, and stores said metadata message in said first memory unit and said second memory unit, respectively, upon receiving said metadata message.

16. The network of claim 10, wherein at least one of said first device first queue and said second device first queue comprises at least one of an entry, a source, a type, a timestamp, a flag, and a message contents column.

17. The network of claim 10, wherein at least one of said first device second queue and said second device second queue comprises at least one of an entry, a source, a type, a timestamp, a flag, an acknowledging (ack) device identifier, an ack cost, and a message contents column.

18. A method of routing a message in a wireless network, said method comprising:

providing a first device, wherein said first devices comprises:

a first transceiver operatively connected to said wireless network and transmitting said message;

a first memory unit comprising:

a first device first queue;

a first device second queue; and a first device table of neighboring devices; and a first central processing unit;

storing first device Not Acknowledged (NAK) messages for said first device in said first device first queue, wherein said first device NAK messages are stored for transmission;

storing first device Acknowledged (ACK) messages for said first device in said first device second queue, wherein said first device ACK messages are transmitted at a lower priority than said first device NAK messages;

maintaining said first device first queue comprising appending said message to be transmitted to said first device first queue and transmitting said message;

maintaining said first device second queue comprising removing said message from said first device first queue and adding said message to said first device second queue only after said first transceiver receives said message;

maintaining said first device table of neighboring devices;

providing a second device, wherein said second device comprises:

a second transceiver operatively coupled to said wireless network and receiving said message;

a second memory unit comprising:

a second device first queue;

a second device second queue; and a second device table of neighboring devices; and a second central processing unit;

storing second device Not Acknowledged (NAK) messages for said second device in said second device first queue, wherein said second device NAK messages are stored for transmission;

storing second device Acknowledged (ACK) messages for said second device in said second device second queue, wherein said second device ACK messages are transmitted at a lower priority than said second device NAK messages;

maintaining said second device first queue comprising adding said message to said second device first queue upon receiving said message;

maintaining said second device second queue;

maintaining said second device table of neighboring devices; and determining at least one of ignoring said message, and storing and forwarding said message.

19. The method of claim 18, further comprising calculating at least one of a Receive Link Quality, a Transmit Link Quality, a link cost, and a route cost.

20. The method of claim 18, wherein at least one of said first device first queue and said second device first queue comprises at least one of an entry, a source, a type, a timestamp, a flag, and a message contents column.

* * * * *